United States Patent
Bansbach et al.

(10) Patent No.: US 6,934,617 B2
(45) Date of Patent: Aug. 23, 2005

(54) METHOD FOR OPERATING AN ADAPTIVE CLUTCH IN A POWER TRANSFER ASSEMBLY

(75) Inventors: Eric A. Bansbach, Fayetteville, NY (US); William E. Smith, Liverpool, NY (US)

(73) Assignee: Magna Drivetrain of America, Inc., Troy, MI (US)

( * ) Notice: Subject to any disclaimer, the term of this patent is extended or adjusted under 35 U.S.C. 154(b) by 0 days.

(21) Appl. No.: 10/672,468

(22) Filed: Sep. 26, 2003

(65) Prior Publication Data

US 2004/0083046 A1 Apr. 29, 2004

Related U.S. Application Data

(63) Continuation of application No. 10/196,899, filed on Jul. 16, 2002, now Pat. No. 6,873,894.

(51) Int. Cl.[7] ............................................. B06F 17/00
(52) U.S. Cl. .................................................... 701/67
(58) Field of Search ................. 701/67–69; 192/3.51, 192/3.55, 3.56; 280/5.5, 5.515, 5.501–5.507

(56) References Cited

U.S. PATENT DOCUMENTS

| | | | | |
|---|---|---|---|---|
| 5,924,703 A | * | 7/1999 | Ichimaru | 280/5.515 |
| 2002/0016653 A1 | * | 2/2002 | Levine | 701/1 |
| 2003/0058506 A1 | * | 3/2003 | Green et al. | 359/172 |
| 2003/0114969 A1 | * | 6/2003 | Dominke et al. | 701/41 |

* cited by examiner

*Primary Examiner*—Thu V. Nguyen
(74) *Attorney, Agent, or Firm*—Harness, Dickey & Pierce P.L.C.

(57) ABSTRACT

The present invention discloses a preferred method for operating a adaptive clutch system of the type used in a motor vehicle power transfer assembly by employing a dithered control signal. One aspect of the present invention superimposes a dithering signal onto a control signal by nulling consecutive blocks of control signal pulses. Another aspect of the present invention provides a method for generating a dithered control signal by providing a wave function with which to systematically vary a duty cycle of the dithered control signal. A method for varying the output force of a clutch actuator assembly in response to the dithered control signal is also provided.

8 Claims, 9 Drawing Sheets

METHOD FOR OPERATING AN ADAPTIVE CLUTCH IN A POWER TRANSFER ASSEMBLY

CROSS-REFERENCE TO RELATED APPLICATIONS

This application is a continuation of U.S. patent application Ser. No. 10/196,899 filed on Jul. 16, 2002 now U.S. Pat. No. 6,873,894.

FIELD OF THE INVENTION

The present invention relates in general to power transfer assemblies for use in four-wheel drive motor vehicles, and more particularly, to a method for operating an adaptive clutch in power transfer assemblies.

BACKGROUND OF THE INVENTION

The drivetrain in many motor vehicles includes a power transfer assembly, such as a transfer case, for transmitting drive torque to all four wheels of the vehicle, thereby establishing a four-wheel drive mode of operation. Some transfer cases incorporate a power transfer system that automatically directs drive torque to the non-driven wheels when the driven wheels lose traction. This "on-demand" 4WD feature is accomplished without any input or action on the part of the vehicle operator. Typically, a clutch assembly is interactively associated with an electronic control system for distributing the drive torque between the driven and non-driven wheels. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle operating parameters, as detected by the sensors.

Transfer cases typically are equipped with a mechanical or hydraulic clutch actuation mechanism for controlling the operation of the clutch assembly. Friction that naturally occurs within the clutch actuation mechanism can hinder its performance. For example, sliding friction can limit the precision with which the clutch actuation mechanism can be controlled. Similarly, static friction can increase the response time of the clutch actuation mechanism and may limit the degree to which small incremental changes in the torque distribution between the driven and non-driven wheels can be made. Thus, a recognized need exists for developing a method for operating an adaptive clutch system that will reduce the negative effects that friction has on its performance.

SUMMARY OF THE INVENTION

In accordance with the present invention, a preferred method is disclosed for operating an adaptive clutch system in a power transfer assembly of the type used in motor vehicle drivelines utilizing a dithered control signal. In a further aspect of the present invention, a dithering signal is superimposed onto a control signal by nulling consecutive blocks of control signal pulses. Another aspect of the present invention superimposes the dithering signal onto the control signal by nulling blocks of control signal pulses over a first half of a dithering period, wherein successive blocks have of an equal or greater number of nulled pulses than the preceding block. The method further includes nulling blocks of control signal pulses over a second half of the dithering period, wherein successive blocks have less or an equal number of nulled pulses than the preceding block. Yet another aspect of the present invention provides a method for generating a dithered control signal by employing a wave function with which to systematically vary a duty cycle of the dithered control signal. A method of varying the output force of a clutch actuator assembly in response to a dithered control signal is also provided.

The method of the present invention for operating a clutch actuation mechanism by employing a dithered control signal is advantageous over conventional methods in that the present invention reduces the negative effect that friction has on the performance of the clutch system. The dithering signal imparts a generally imperceptible motion to the clutch actuation mechanism, which reduces the frictional forces within the mechanism and improves the overall response characteristics of the clutch system. Additional advantages and features of the present invention will become apparent from the following description and appended claims, taken in conjunction with the accompanying drawings. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

In general this invention relates to methods for reducing the negative effect that friction has on the performance of a digitally controlled torque distributing clutch system of the type well-suited for use in motor vehicle driveline applications. For example, the present invention can be employed with various transfer cases, such as those disclosed in the following U.S. patents: U.S. Pat. No. 6,354,977, entitled "Transfer Case With Hydraulic Range Shift And Adaptive Clutch Control", which issued to Brown et al, on Mar. 12, 2002; U.S. Pat. No. 6,283,887, entitled "Transfer Case With Synchronized Range Shift And Adaptive Clutch Control", which issued to Brown et al. on Sep. 4, 2001; and U.S. Pat. No. 5,363,938, entitled "Power Transfer System For A Four-Wheel Drive Vehicle", which issued to Wilson et al. on Nov. 15, 1994; the forgoing patents are all incorporated herein by reference. Although the present invention makes specific reference to a transfer case, it shall be appreciated that this invention is equally applicable to other digitally-controlled clutch mechanisms. Accordingly, a detailed description of the present invention shall be preceded by a description of the components and operation of an exemplary transfer case.

Figure 1:
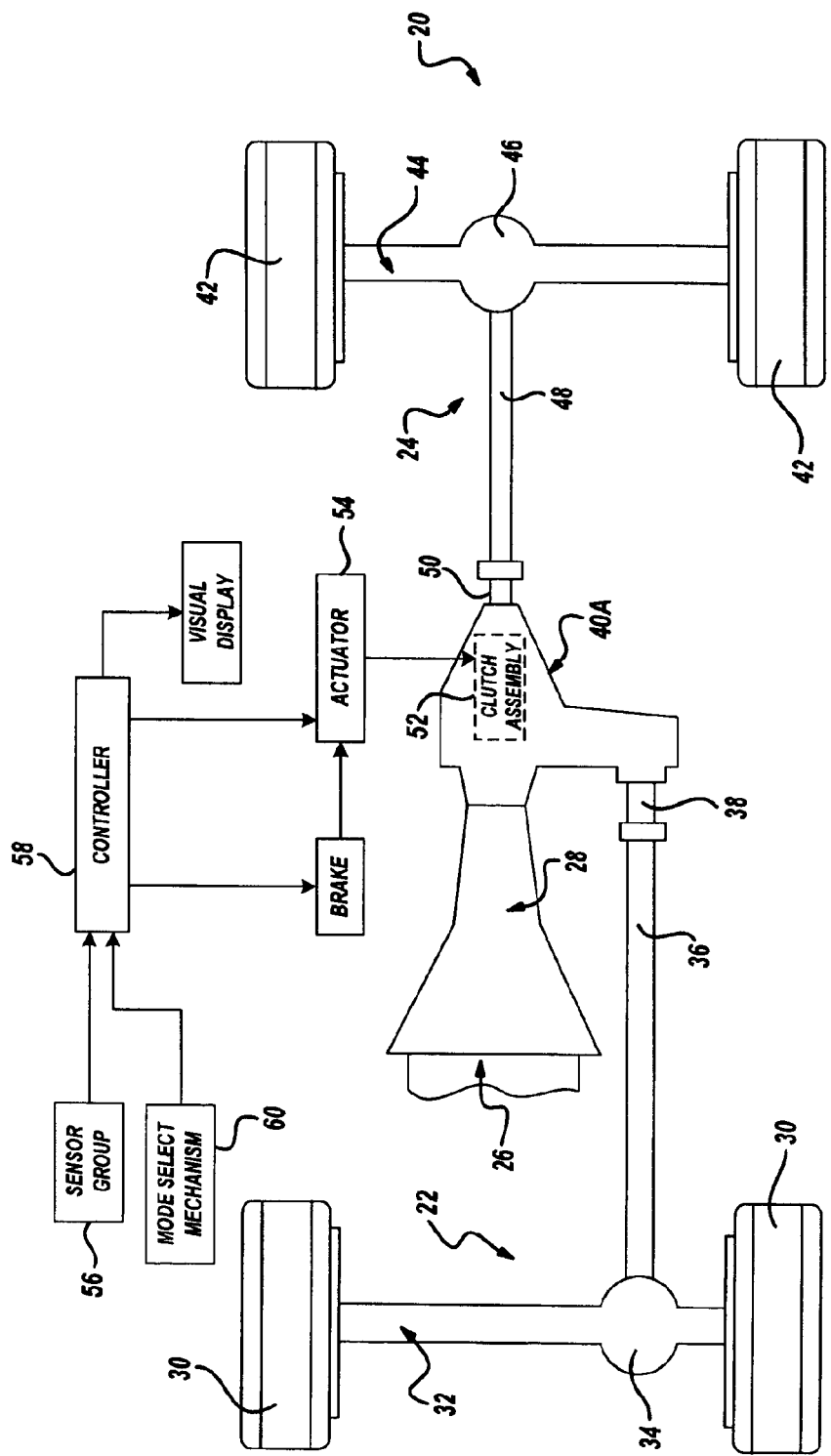
FIG. 1 is a schematic representation of a four-wheel drive motor vehicle equipped with a power transfer system of the present invention.

Referring to FIG. 1 of the drawings, a drivetrain for a four-wheel drive automotive vehicle is shown. The drivetrain includes a front drive line 22, a rear drive line 24, and a power source, such as an engine 26 (partially shown), which provides drive torque to the front and rear drive lines through a transmission 28. Transmission 28 may be either a manual or automatic shifting type. Front drive line 22 is shown to include a pair of front wheels 30 connected to opposite ends of a front axle assembly 32 having a front differential 34. Front differential 34 is coupled to one end of a front prop shaft 36, the opposite end of which is coupled to a front output shaft 38 of a transfer case 40A. Similarly, rear drive line 24 includes a pair of rear wheels 42 connected to opposite ends of a rear axle assembly 44 having a rear differential 46. Rear differential 46 is coupled to one end of a rear prop shaft 48, the opposite end of which is coupled to a rear output shaft 50 of transfer case 40A. Transfer case 40A is equipped with an electronically-controlled torque distributing clutch 52 that is operable to control the magnitude of speed differentiation and torque distribution between output shafts 38 and 50. To control adaptive actuation of clutch 52, the present invention further contemplates use of a power transfer system 20.

Power transfer system 20 includes a power-operated actuator assembly 54 for actuating torque distributing clutch 52, a group of sensors 56 for monitoring specific dynamic and operational characteristics of the motor vehicle and generating sensor signals indicative thereof, and a controller 58 for generating control signals in response to the sensor input signals. Moreover controller 58 is adapted to control the actuated condition of torque distributing clutch 52 by sending digital control signals to actuator assembly 54.

Power transfer system 20 also includes a mode select mechanism 60 for enabling a vehicle operator to select one of the available drive modes. In particular, controller 58 controls actuator assembly 54 in response to a mode signal sent to controller 58 from mode select mechanism 60 that is indicative of the particular drive mode selected. When an "adaptive" four-wheel drive mode is selected, controller 58 operates to continuously monitor and automatically regulate the actuated condition of torque distributing clutch 52 between its non-actuated and fully actuated limits, thereby varying the magnitude of speed differentiation and torque distribution between output shafts 38 and 50. When the mode signal indicates that a "locked" four-wheel drive mode has been selected, torque distributing clutch 52 is fully actuated, whereby non-differentiated power is delivered to output shafts 38 and 50. The locked four-wheel drive mode is provided to permit improved traction when the vehicle is operated off road or over severe road conditions.

Figure 2:
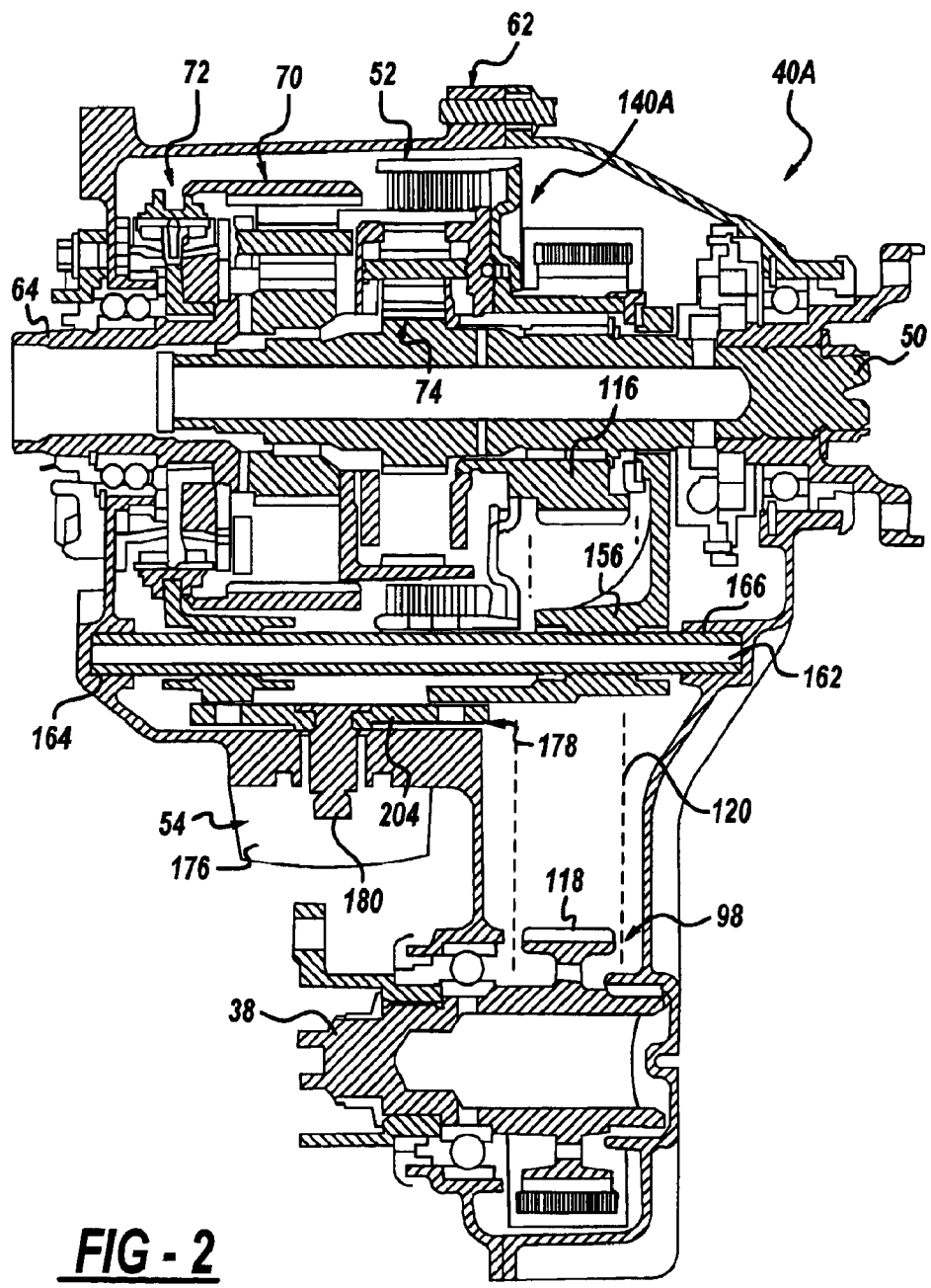
FIG. 2 is a sectional view of a two-speed full-time transfer case constructed according to one preferred embodiment of the present invention.
Figure 3:
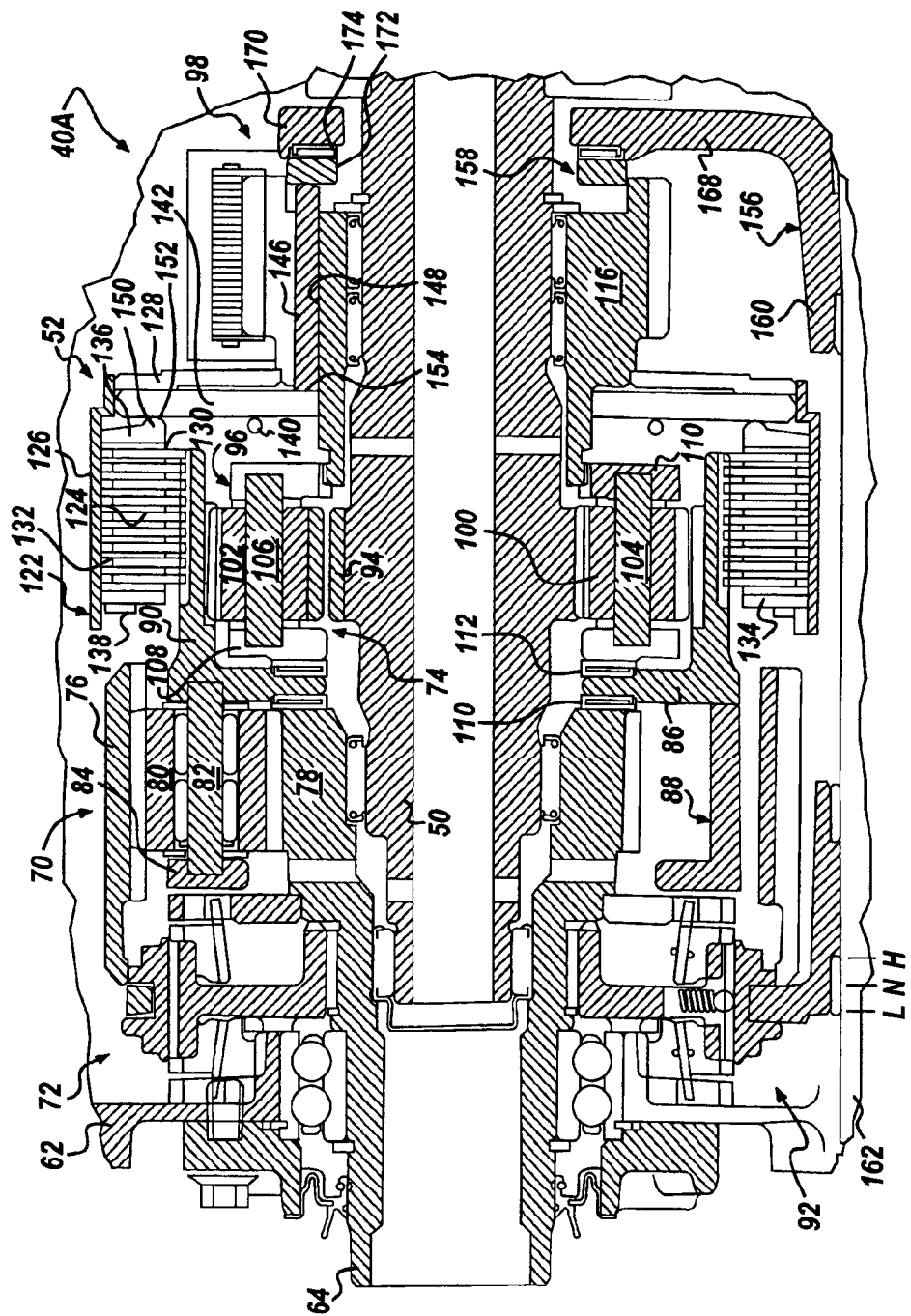
FIG. 3 is an enlarged partial sectional view taken from FIG. 2 showing the components of the transfer case in greater detail.

Referring to FIGS. 2 and 3, the structure and operation of a full-time four-wheel drive transfer case 40A will now be described. Transfer case 40A is shown to include a housing assembly 62 and an input shaft 64 rotatably supported from housing assembly 62. Input shaft 64 is adapted for connection to an output shaft (not shown) of transmission 28, such that both are rotatably driven by engine 26 of the automotive vehicle. Rear output shaft 50 is rotatably supported between input shaft 64 and housing assembly 62, while front output shaft 38 is rotatably supported from housing assembly 62. In addition to a torque distributing clutch assembly 52, transfer case 40A is also shown to include a planetary gear assembly 70, a synchronized range shift mechanism 72, and an interaxle differential 74. Planetary gear assembly 70 includes a first ring gear 76, a first sun gear 78 fixed for rotation with input shaft 64, and a set of first pinion gears 80 which are each rotatably supported on a pinion shafts 82 and meshed with first sun gear 78 and first ring gear 76. Each pinion shaft 82 extends between a front carrier ring 84 and a rear carrier ring 86, which are interconnected to define a planet carrier 88. A second ring gear 90 extends from rear carrier ring 86 of planet carrier 88 and acts as an input to inter-axle differential 74.

Planetary gear assembly 70 functions as a two speed gear reduction unit which, in conjunction with a range clutch 92 that is associated with synchronized range shift mechanism 72, is operable to establish a first and second drive connection between input shaft 64 and second ring gear 90. To establish the first drive connection, first ring gear 76 is coupled by range clutch 92 for common rotation with input shaft 64. Thus, the first drive connection defines a high-range drive mode in which planet carrier 88 and second ring gear 90 are driven at a first (i.e., direct) speed ratio with respect to input shaft 64. Likewise, the second drive connection is established by range clutch 92 coupling first ring gear 76 to housing assembly 62. As such, the second drive connection defines a low-range drive mode in which planet carrier 88 and second ring gear 90 are driven at a second (i.e., reduced) speed ratio to relative input shaft 64. A neutral mode is established when range clutch 92 decouples first ring gear 76 from both input shaft 64 and housing assembly 62. Synchronized range shift mechanism 72 is operable for permitting transfer case 40A to be shifted "on the move" between its high-range and low-range drive modes.

Interaxle differential 74 functions to permit speed differentiation and to distribute drive torque between front output shaft 38 and rear output shaft 50 so as to establish a differentiated or "full time" four-wheel drive mode. Second ring gear 90, when driven at either the first or second speed ratios, acts as the input to interaxle differential 74. Interaxle differential 74 also includes a planetary gear set with outputs operably coupled to front output shaft 38 and rear output shaft 50. According to the particular embodiment shown, the gear set includes a second sun gear 94 fixed for rotation with rear output shaft 50, a pinion carrier 96 coupled via a transfer mechanism 98 for rotation with front output shaft 38, a set of second pinions 100 rotatably supported from pinion carrier 96 and meshed with second sun gear 94, and a set of third pinions 102 that are rotatably supported from pinion carrier 96 and meshed with second ring gear 90. In addition, pinions 100 and 102 are arranged in meshed pairs and supported on corresponding pinion posts 104 and 106, which extend between a front carrier plate 108 and a rear carrier plate 110 that are interconnected to define pinion carrier 96. Thrust bearings 110 and 112 locate rear carrier ring 86 for rotation relative to first sun gear 78 and front carrier plate 108.

Transfer mechanism 98 includes a drive sprocket 116 rotatably supported on rear output shaft 50 and is connected to rear carrier plate 110 of pinion carrier 96. Transfer mechanism 98 also includes a drive sprocket 118 fixed to front output shaft 38, and a power transfer device, such as a chain 120, that interconnects drives sprocket 116 to drive sprocket 118.

The torque distributing clutch 52 is adapted for controlling speed differentiation and torque biasing between second ring gear 90 and pinion carrier 96 of interaxle differential 74. Torque distributing clutch 52 is a multi-plate friction clutch assembly which includes an outer drum 122 fixed for rotation with drive sprocket 116 and a clutch pack 124 operably installed between outer drum 122 and second ring gear 90. Outer drum 122 includes a cylindrical drum housing 126 suitably fixed to a housing plate 128, which, is rigidly attached to drive sprocket 116. Clutch pack 124 includes a set of inner clutch plates 130 splined to second ring gear 90. Inner clutch plates 130 are interleaved with a set of outer clutch plates 132, which are splined to drum housing 126. Clutch pack 124 is shown to be positioned between a reaction plate 134 splined to drum housing 126 and a pressure plate 136 journalled in drum housing 126. A snap ring 138 axially restrains and locates reaction plate 134 on drum housing 126. Movement of pressure plate 136 functions to vary the frictional compressive force exerted on clutch pack 124 for by biasing the torque distribution between rear output shaft 50 and front output shaft 38.

Torque distributing clutch 52 is also shown to include a clutch actuation mechanism 140A for moving pressure plate 136 under the control of actuator assembly 54. Clutch actuation mechanism 140A includes a set of lever arms 142 disposed adjacent to housing plate 128, a return spring 144 that engages lever arms 142, and a set of thrust pins 146 retained in throughbores 148 formed in drives sprocket 116. Lever arms 142 are retained for pivotal movement in radial channels formed in drum plate 128. Throughbores 148 are circumferentially equally spaced and are aligned with the radial channels in drum plate 128.

An annular rim projection 150 on pressure plate 136 engages an upper front face 152 of each lever arm 142, while a first end 154 of each thrust pin 146 engages a lower rear face of a corresponding lever arm 142. Thus, axial sliding movement of the thrust pin 146 in a first (i.e., forward) direction from a fully retracted position to a fully extended position causes lever arms 142 to pivot, in opposition to the biasing of return spring 144, from a first position to a second position. With lever arms 142 in the first position, pressure plate 136 exerts a predetermined minimum clutch engagement force on clutch pack 124. In contrast, when lever arms 142 are in the second position, pressure plate 136 exerts a predetermined maximum clutch engagement force on clutch pack 124.

To provide means for moving thrust pins 146 between the fully retracted and extended positions, clutch actuation mechanism 140A further includes a mode fork 156 and a thrust bearing assembly 158. Mode fork 156 has a tubular segment 160 journalled on a shift rail 162, the opposite ends of which are supported in sockets 164 and 166 formed in housing assembly 62. Mode fork 156 is further comprised of an arm segment 168 with an end portion 170 at least partially surrounding rear output shaft 50. Thrust bearing assembly 158 includes a thrust ring 172 and a bearing assembly 174 disposed between thrust pins 146 and end portion 170 of arm segment 168 on mode fork 156. The second end of each thrust pin 146 engages thrust ring 172. Thus, axial movement of mode fork 156 along shift rail 162 causes corresponding axle movement of thrust pins 146, which as previously noted, functions to control actuation of torque distributing clutch assembly 52.

Actuator 54 preferably includes a rotary actuator, such as an electric gearmotor 176, which is operable for generating an output torque. The magnitude of the output torque varies as a function of the magnitude of the electrical control signal that is applied to electric gearmotor 176 by controller 58. To provide a means for selectively controlling the magnitude of the clutch engagement force exerted on clutch pack 152, actuator 54 further includes a drive mechanism 178. Drive mechanism 178 is interconnected to a rotary output member 180 of gearmotor 176 and includes a camming arrangement for changing the torque output from gearmotor 176 into an axially directed force that is used to control axial movement of mode fork 156.

When transfer case 40A is operating in its full time four-wheel high-range drive mode, electronically-controlled torque distributing clutch 52 is operable to provide active torque biasing across inter-axle differential 74. This is accomplished by continuously monitoring and modulating the actuated state of gearmotor 176 in accordance with specific predefined relationships based on the current value of the sensor input signals generated by sensors 56. Thus, in the full time four-wheel high-range drive mode, power transfer system 20 acts as an adaptive system for continuously monitoring and automatically regulating the actuated condition of torque distributing clutch assembly 52 independent of any deliberate action by the vehicle operator.

According to the disclosed embodiment, the magnitude of the engagement force generated by lever arm 142 and applied to clutch pack 124 is proportional to the magnitude of the output torque generated by gearmotor 176. The magnitude of the torque produced by gearmotor 176 is in turn proportional to the electrical power (i.e., volt-amperes or watts) supplied to gearmotor 176. The power supplied to gearmotor 176 is likewise proportional to the potential difference or voltage drop across gearmotor 176. Thus, the percentage of drive torque that is transmitted by input shaft 64 and transferred through clutch pack 124 to front output shaft 38 is proportional to the voltage drop across gearmotor 176. Consequently, the distribution ratio of drive torque between front output shaft 38 and rear output shaft 50 may be optimized by selectively changing the voltage drop across gearmotor 176.

The voltage drop across gearmotor 176 is preferably controlled by means of a digital control signal that can be selectively modulated to achieve a desired effective voltage. The control signal employs pulse width modulation (PWM), a series of repeating on and off pulses, to vary the voltage applied to gearmotor 176. At any given time, the voltage applied to gearmotor 176 is either switched fully on or fully off. The on-time is the time during which a full supply voltage is applied to gearmotor 176, and the off-time is the period during which the voltage is switched off.

Figure 4:
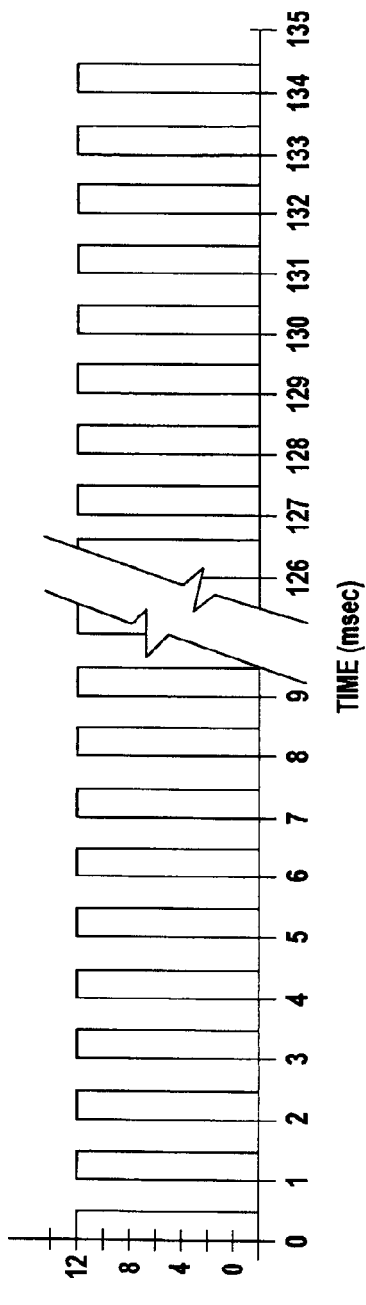
FIG. 4 is a graphical depiction of an exemplary digital control signal employed in the present invention.

FIG. 4 shows an exemplary control signal consisting of a modulated voltage pulse train that is used to control the torque output from gearmotor 176. The control signal is shown to have a frequency of 1 KHz. While it shall be appreciated that a control signal operating at a frequency higher or lower than 1 KHz may also be used with satisfactory results, it shall also be understood that that the optimum frequency will likely vary depending on the operating characteristics of the particular actuating mechanism being used. For the particular embodiment described herein, the control signal will preferably operate at a frequency of not less than 1 KHz for control purposes.

The control signal voltage pulse train shown in FIG. 4 is generated using a typical twelve-volt power source. The 1

Figure 5:
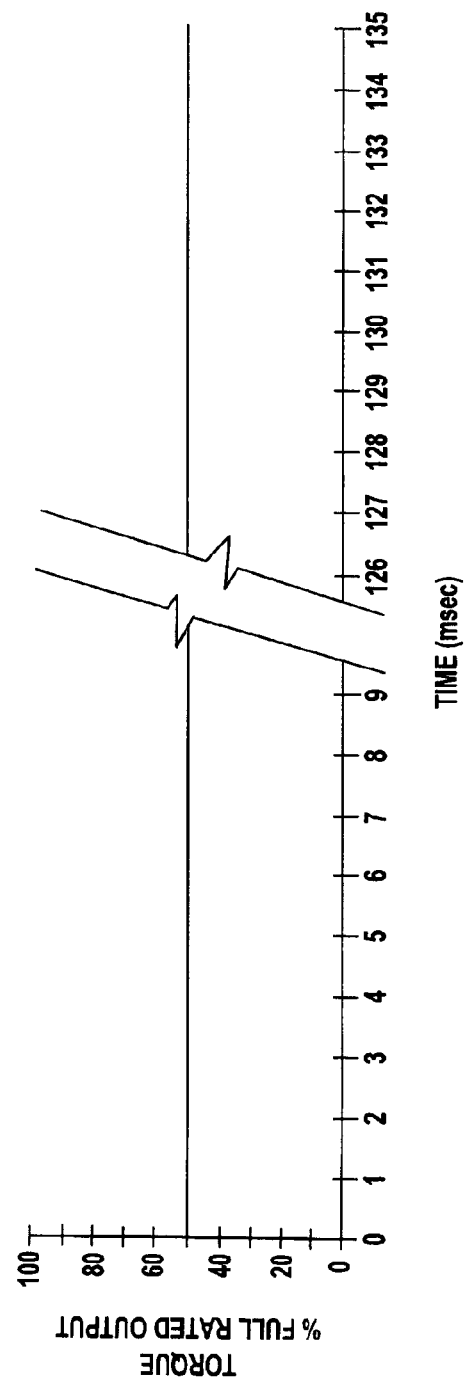
FIG. 5 is a graphical depiction of the torque output produced by a transfer case gearmotor when employing the control signal shown in FIG. 4.

KHz control signal has a period of one millisecond, which is the time required to complete one full on/off cycle. The control signal is shown to have a 50% duty cycle. The duty cycle represents the percentage of time during each period that the voltage is switched on. Thus, a 50% duty cycle has the voltage switched on for 50% of the period and off for 50%. Likewise, a 90% duty cycle has the voltage switched on for 90% of the period and off for the remaining 10%. Continuously switching the voltage on and off generates a pulse train, wherein the duration of each pulse is proportional to the voltage being applied to gearmotor 176. For example, if the supply voltage is twelve volts and the duty cycle is set at 50%, gearmotor 176 will function as if a six-volt analog signal was being applied to gearmotor 176. Since the torque output from gearmotor 176 is proportional to the voltage applied thereto, the control signal will cause gearmotor 176 to generate a torque output that is approximately 50% of its maximum rated output, as shown in FIG. 5.

As previously described, the percentage of drive torque that is transmitted through clutch pack 124 to front output shaft 38 is proportional to the voltage applied to gearmotor 176. For example, if input shaft 64 transmits 1000 Nm of torque from transmission 28, a control signal having a 100% duty cycle will result in 1000 Nm torque being distributed equally between front output shaft 38 and rear output shaft 50 (assuming, of course, transfer case 40A is operating at 100% efficiency). A control signal operating with a 100% duty cycle will cause clutch plates 132 and 130 to fully engage and rotate with the same angular velocity (i.e., no relative motion between the clutch plates), which will result in output shafts 38 and 50 each transmitting 500 Nm of torque. On the other hand, if controller 58 produces a control signal having a 50% duty cycle, 250 Nm of torque will be transmitted to output shaft 38, while 750 Nm of torque will be transmitted to output shaft 50. Thus a 50% duty cycle will result in a 2:1 torque distribution ratio between front output shaft 38 and rear output shaft 50.

When a vehicle operator selects the adaptive four-wheel drive mode, controller 58 operates to continuously monitor and automatically regulate the actuated condition of torque distributing clutch 52. Controller 58 regulates the actuated condition of torque distributing clutch 52 by adjusting the voltage applied to gearmotor 176. The voltage required to achieve a desired output torque at output shaft 38, however, may vary depending on whether the voltage is being increased or decreased to achieve the desired torque output. Gearmotor 176 will typically have to generate a higher torque to achieve a given torque output at front output shaft 38 when the torque is being increased rather than decreased. The difference is primarily due to the effects of sliding friction within clutch actuation mechanism 140A.

Increasing the output torque at front output shaft 38 creates sliding friction within clutch actuation mechanism 140A. The friction acts as a resistance to the sliding motion that occurs between the moving elements of clutch actuation mechanism 140A. Sliding friction causes gearmotor 176 to have to generate a higher torque to achieve a given torque output at front output shaft 38 than it would if there was no sliding friction. This is because a portion of the torque produced by gearmotor 176 is used to overcome the sliding friction, leaving less torque available for applying a compressive force across clutch pack 124. The opposite, however, occurs when decreasing the output torque at front output shaft 38. When decreasing the output torque, the sliding friction occurring within clutch actuation mechanism 140A no longer resists the torque generated by gearmotor 176, but instead acts as a resistance to the biasing force generated by spring 144. The biasing force of spring 144 acts to decrease the compressive force on clutch pack 124 whenever the torque output of gearmotor 176 is reduced. Because the sliding friction is not resisting movement caused by gearmotor 176, the gearmotor does not have to generate additional torque to overcome the sliding friction like it does when increasing the torque output at output shaft 38. As a result, gearmotor 176 will have to generate less torque to produce the same torque output at front output shaft 38 when the torque is being decreased rather than increased.

Like sliding friction, static friction within clutch actuation mechanism 140A may also limit the accuracy with which the clutch system can be controlled. This may occur, for example, when attempting to make relatively small incremental changes to the output torque of front output shaft 38. To change the output torque at output shaft 38, the change in torque output from gearmotor 176 must, as minimum, be large enough to overcome the static friction within clutch actuation mechanism 140A. If it is not, clutch actuation mechanism 140A will not move and the torque distribution to front output shaft 38 will remain unchanged. On the other hand, if the change in torque output from gearmotor 176 is sufficient to overcome the static friction, clutch actuation mechanism 140A will commence moving. Once clutch actuation mechanism 140A begins to move, the resistive force caused by static friction will decrease to the level that corresponds with sliding friction. If the torque output from gearmotor 176 is not adjusted to compensate for the lower resistive force from sliding friction, the compressive force applied to clutch pack 124 will increase by an amount that is approximately equal to the difference between the static and sliding friction forces. This can cause the clutch system to "overshoot" the targeted output torque, thereby making it difficult to precisely control the torque output from front output shaft 38.

The negative effect that friction, and in particular, static friction, has on the performance of clutch actuation mechanism 140A can be reduced by not allowing the clutch actuation mechanism to come to rest. Since static friction typically becomes a factor when the clutch system is at rest, keeping the clutch system continuously moving can diminish its effect.

The present invention discloses at least three methods for minimizing the negative effect of static friction by superimposing a dithering signal onto the control signal generated by controller 58. The control signal with the dithering signal superimposed shall be referred to as a "dithered control signal". The dithering produces a relatively low frequency (relative to the frequency of the control signal) oscillation of clutch actuation mechanism 140A. The oscillations preferably have a low amplitude so as to not appreciably affect the operation of the vehicle.

Figure 6:
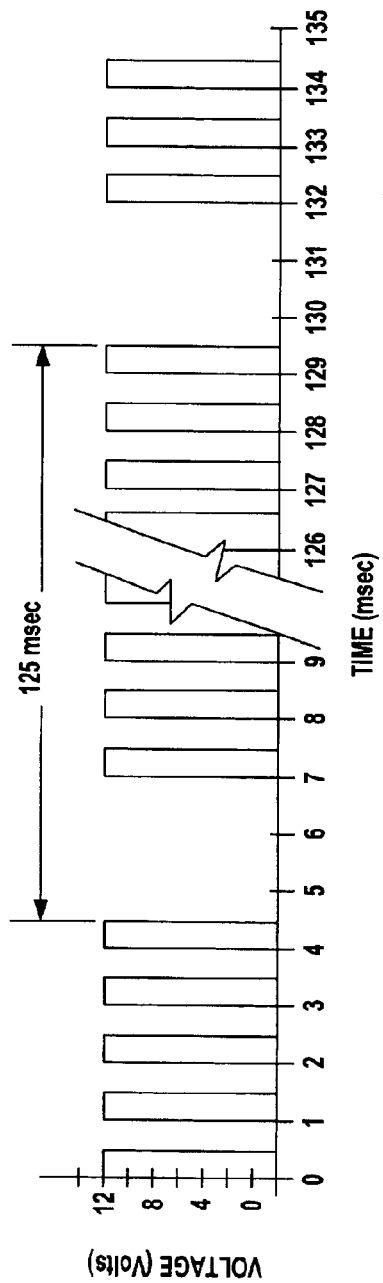
FIG. 6 is a graphical depiction of a preferred embodiment of a dithered control signal employed in the present invention.

FIG. 6 shows a preferred embodiment of the present invention wherein an 8 Hz dithering signal is superimposed onto the 1 KHz control signal shown in FIG. 4. The dithering signal is superimposed onto the control signal by nulling blocks of consecutive pulses at 125 millisecond intervals. The interval between blocks of nulled pulses is determined by taking the reciprocal of the dithering signal frequency (i.e., ⅛ Hz=0.125 seconds=125 milliseconds).

The number of consecutively nulled pulses in each block determines the amplitude of the dithered control signal. Generally, the more pulses that are nulled the greater the amplitude. The amplitude of the dithered control signal, however, is also affected by the response characteristics of clutch actuation mechanism 140A. A clutch actuation mechanism having a slow response characteristic will require more pulses to be nulled than a clutch system with a faster response to achieve the same amplitude.

Figure 7:
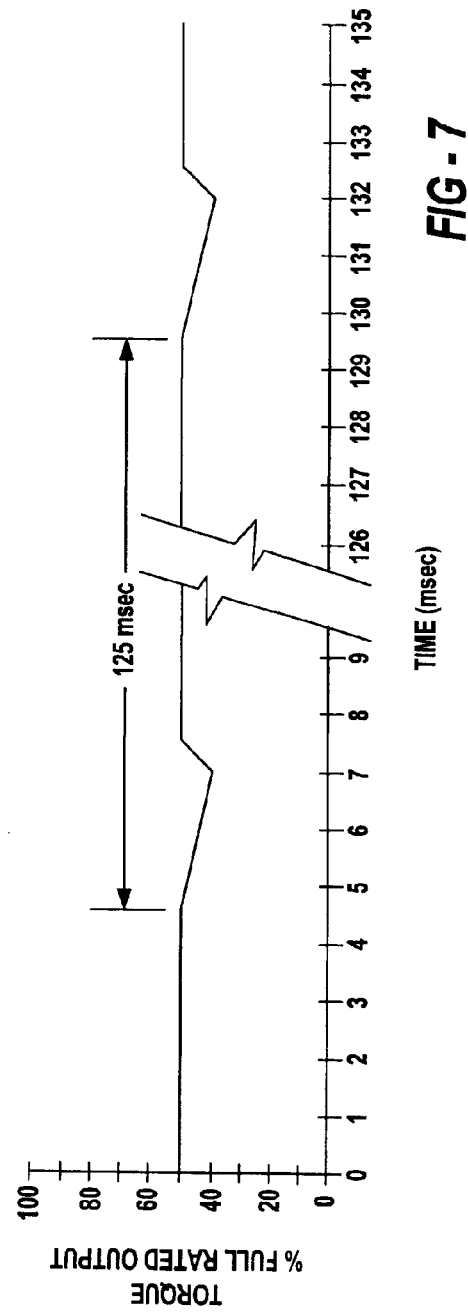
FIG. 7 is a graphical depiction of the torque output produced by the transfer case gearmotor when employing the control signal shown in FIG. 6.

Employing the dithered control signal shown in FIG. 6 as the control signal for gearmotor 176 causes the torque output from gearmotor 176 to vary as shown in FIG. 7. Since the torque output of gearmotor 176 is proportional to the duty cycle of the dithered control signal, gearmotor 176 will have a base torque output that is 50% of the gearmotor's maximum rated output torque. The 8 Hz dithering signal produces a dip in the base torque output at 125 millisecond intervals. The duration of the time interval between dips in torque is dependant on the frequency of the dithering signal. For example, a 20 Hz dithering signal will cause a dip in the base torque output every 50 milliseconds rather than the 125 milliseconds that occurs when using a 8 Hz dithering signal. The amplitude of the dip in torque is shown to be approximately 10% of the maximum rated torque output of gearmotor 176. The skilled artisan shall appreciate, however, that the amplitude may vary from that shown and will depend in large part on the functional characteristics of particular transfer case in which the present invention is employed.

Figure 8:
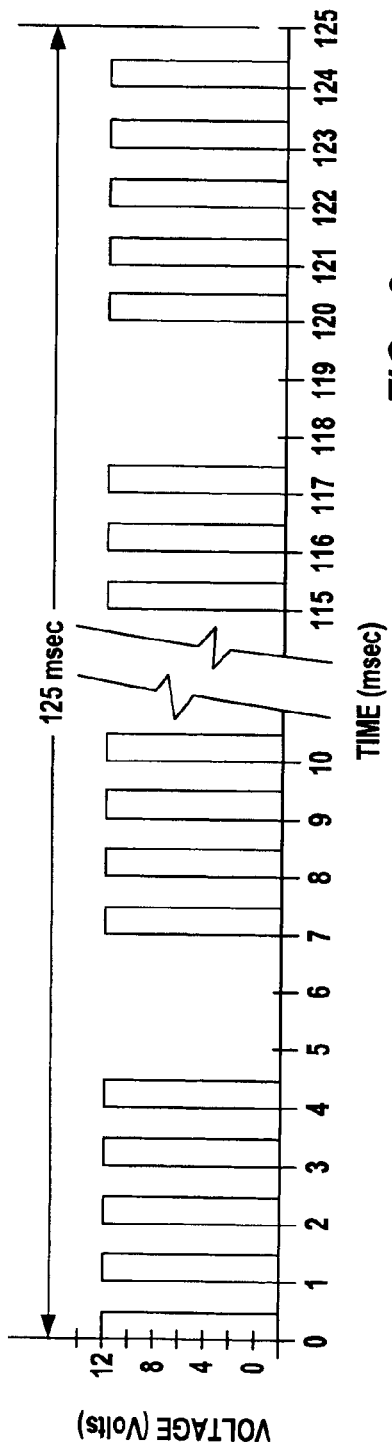
FIG. 8 is a graphical depiction of a another preferred embodiment of a dithered control signal employed in the present invention.

A second preferred embodiment of the present invention provides for the dithering signal to be superimposed onto the control signal by varying the number of pulses that are blanked, as shown in FIG. 8. This method allows a more sinusoidal or tonal dithering of the control signal, which in turn produces a more sinusoidal or tonal torque output form gearmotor 176. For example, to superimpose an 8 Hz dithering signal onto the control signal shown in FIG. 4, blocks of consecutive control signal pulses are nulled. Each block consists of a predetermined number of nulled pulses. The number of nulled pulses in each block, together with the number of active pulses between the blocks of nulled pulses, determines the shape of the dithered control signal.

The dithered control signal shown in FIG. 8 is generated by first progressively increasing the number of nulled pulses in each succeeding block of nulled pulses. For example, the first block is shown to have 2 pulses nulled, the second block four pulses, and so on. This scheme continues for 62.5 milliseconds, which is one half the period of the dithering signal (i.e., 125 milliseconds). The scheme is then reversed, and the number of nulled pulses in each consecutive block of nulled pulses is progressively decreased in a manner that mirrors the scheme utilized during the first half of the dithered control signal period. This scheme is repeated every 125 milliseconds. It shall be appreciated, however, that dithering signals operating at other frequencies may also be superposed using this method. It shall also be understood that it is not necessary that the pulses be nulled in precisely the manner shown in FIG. 8. Indeed, the number of nulled pulses in each block, as well as the distribution of the blocks, may be readily varied to produce a multitude of dithered control signals of varying wave shapes.

Figure 9:
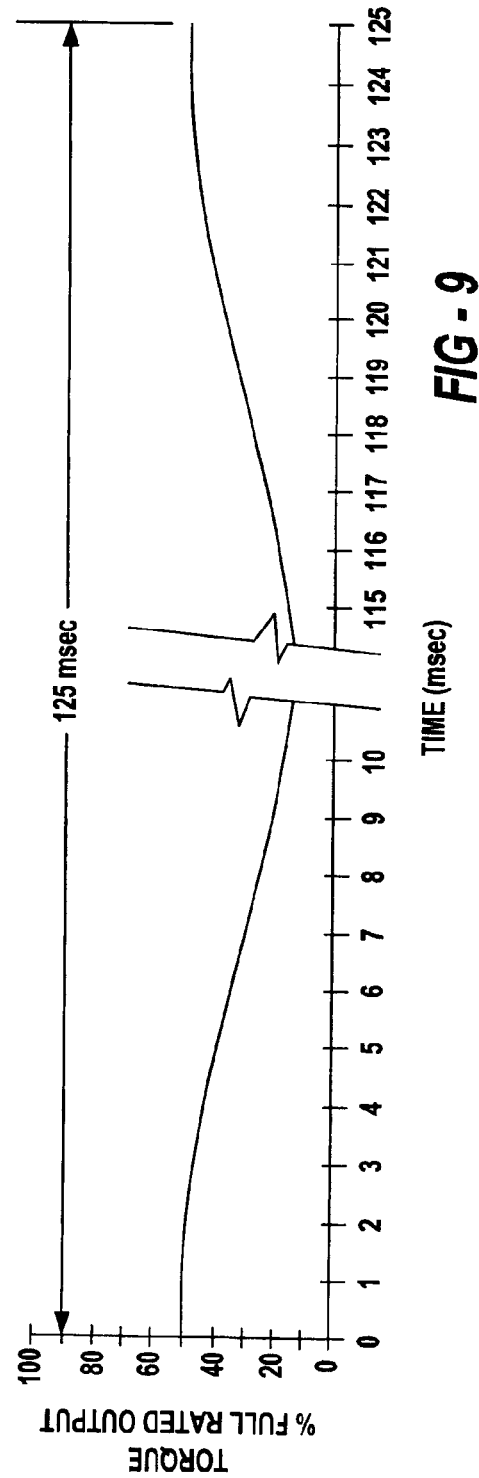
FIG. 9 is a graphical depiction of the torque output produced by the transfer case gearmotor when employing the control signal shown in FIG. 8.

Superimposing the 8 Hz dithering signal onto the control signal shown in FIG. 4 causes the torque output from gearmotor 198 to vary in a manner similar to that shown in FIG. 9. Continuously varying the torque output from gearmotor 176 prevents clutch actuation mechanism 140A from coming to rest (with the possible exception of a brief pause when the clutch actuation mechanism changes direction), thereby minimizing the detrimental effect static friction has on the performance of the clutch actuation mechanism. The amplitude of the torque curve is shown to be approximately 30% of the maximum rated torque output of gearmotor 176. It shall be appreciated, however, that the amplitude may vary from that which is shown, and will depend in large part on the functional characteristics of particular transfer case in which the present invention is employed.

A third preferred method for superimposing a dithering signal onto the control signal generated by controller 58 consists of using a wave function to continuously varying the duty cycle of the control signal to produce a dithered control signal. To generate a dithered control signal having a desired wave shape, amplitude, and period, the duty cycle of each pulse of a digitized control signal pulse train is determined according to the following formula:

$$PDC=DC_{avg}+AMP*WF$$

where:
PDC is the duty cycle of a particular pulse at a particular time (pulse duty cycle);
$DC_{avg}$ is a time averaged duty cycle about which the dithered control signal fluctuates;
AMP is the amplitude of the dithered control signal; and
WF is the wave function that determines the shape of the dithered control signal. The wave function WF can be a sine, cosine, triangular, or square wave function, or any other function capable of producing a desired wave shape.

Figure 10:
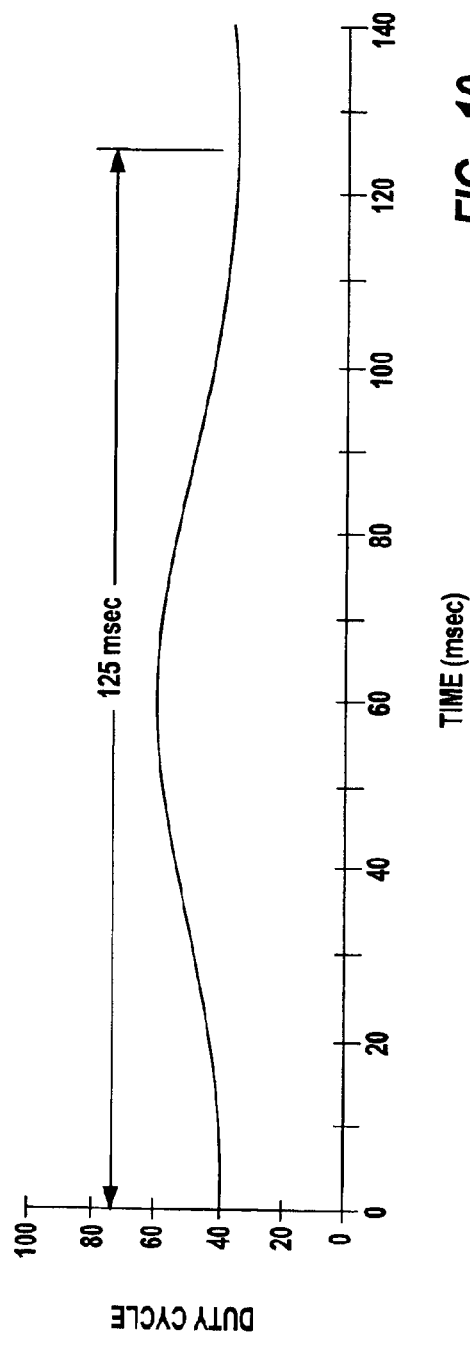
FIG. 10 is a graphical depiction of yet a another preferred embodiment of a dithered control signal employed in the present invention.

An exemplary dithered control signal generated in accordance with the third preferred embodiment of the present invention is shown in FIG. 10. A sine function is used as the wave function WF. The dithered control signal has a period (i.e., wavelength) of 125 milliseconds, which corresponds to a dithering frequency of 8 Hz. The amplitude of the dithered control signal is set at 10% of the full duty cycle. Although the dithered control signal generated by controller 58 is digital, for the purposes of clarity the dithered control signal is shown in its equivalent analog form since each pulse of the digital pulse train varies by less than one half percent, making it difficult to graphically illustrate the digital signal.

Figure 11:
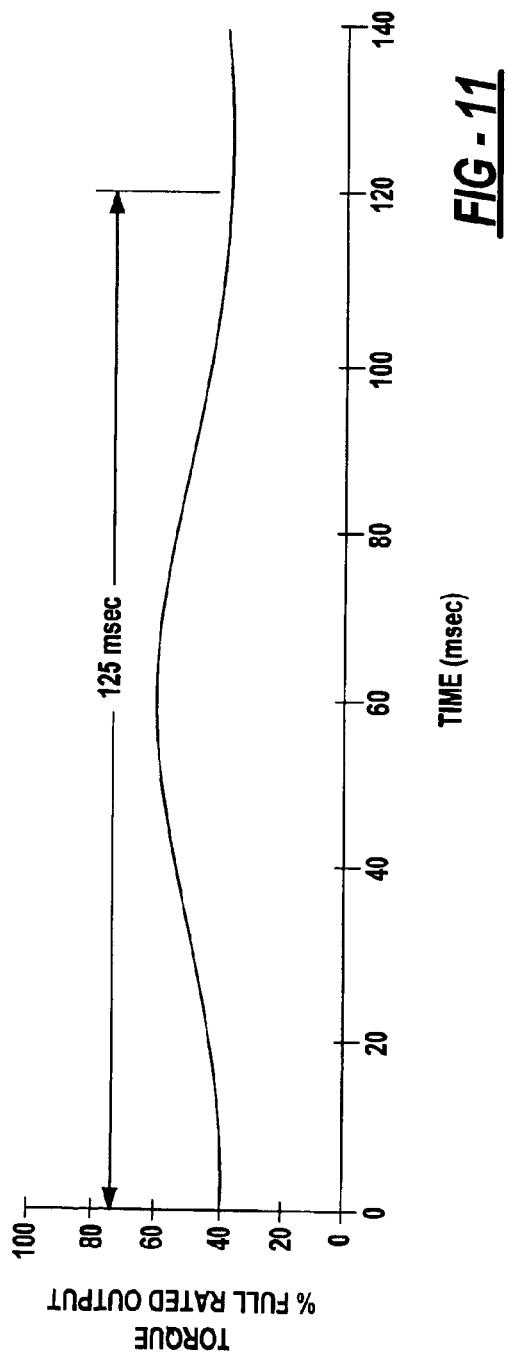
FIG. 11 is a graphical depiction of the torque output produced by the transfer case gearmotor when employing the control signal shown in FIG. 10.

Because the torque output of gearmotor 176 is proportional to the magnitude of the control signal, the dithered control signal shown in FIG. 10 will cause the torque output of gearmotor 176 to fluctuate as shown in FIG. 11. The torque output from gearmotor 176 has substantially the same period and amplitude as the dithered control signal. The fluctuating torque curve is shown to have a period of 125 milliseconds and an amplitude of 10% of the rated torque output of gearmotor 176. The relatively low frequency fluctuation of the torque output from gearmotor 176 prevents clutch actuation mechanism 140A from substantially coming to rest, although the clutch actuation mechanism may briefly come to rest as the torque output from gearmotor 176 reaches an apex of the torque curve, at which point the motion of clutch mechanism changes direction. Continuously moving clutch actuation mechanism 140A will reduce the negative effect that static friction may have on the performance of the clutch actuation mechanism.

Figure 12:
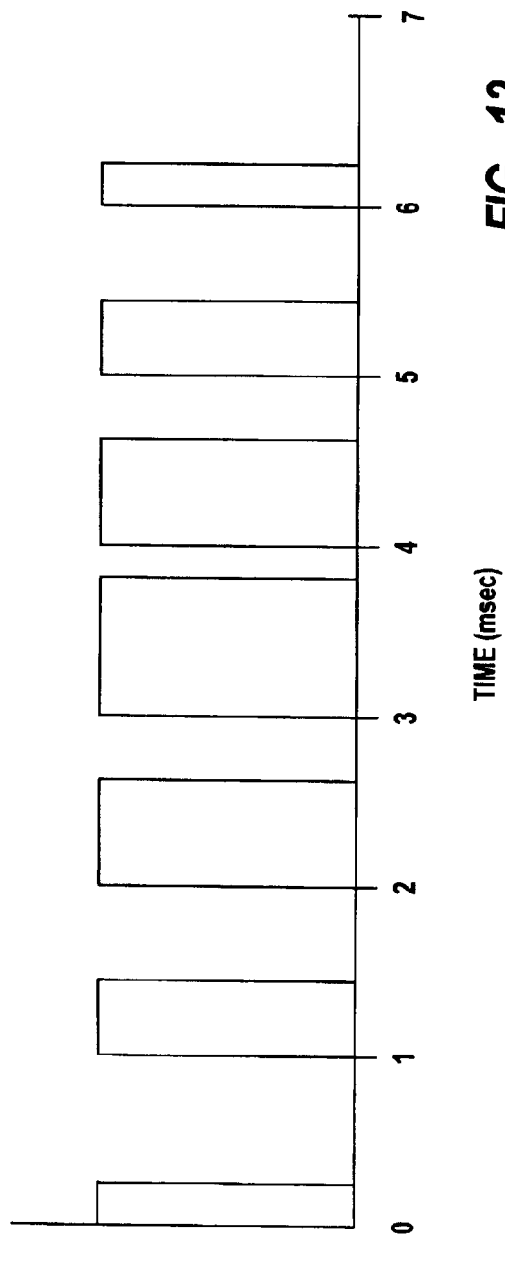
FIG. 12 is a graphical depiction of yet a another preferred embodiment of a dithered control signal employed in the present invention.

Another exemplary dithered control signal generated in accordance with the third preferred embodiment of the present invention is shown in FIG. 12. The pulse train shown in the figure is generated using the following wave function:

$$WF=sin(360*t/DP)$$

where:
DP is a period or wavelength of the dithering signal in seconds; and
t is time in seconds, and varies between zero and the period or wavelength of the dithering signal.

Figure 13:
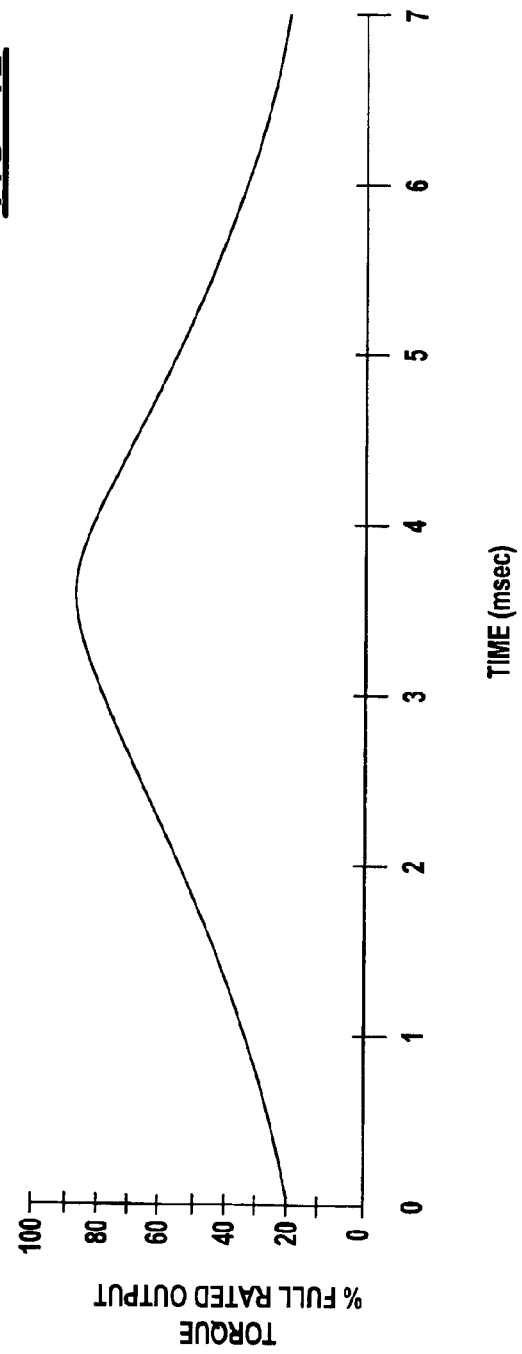
FIG. 13 is a graphical depiction of the torque output produced by the transfer case gearmotor when employing the control signal shown in FIG. 12.

The duty cycle of the dithered control signal of FIG. 12 is shown to oscillate about the 50% duty cycle and have an equivalent analog amplitude of 30%. Since the torque output from gearmotor 176 is proportional to the duty cycle of the control signal, the dithered control signal shown in FIG. 12 will cause the torque output from gearmotor 176 to fluctuate as shown in FIG. 13. The torque curve is substantially the analog equivalent of the digital control signal shown in FIG. 12, having a similar period, amplitude, and average magnitude.

The torque output from gearmotor 176 is shown to continuously fluctuate about an average torque output of 50% of the gearmotor's maximum rated torque output, which corresponds to the 50% average duty cycle of the dithered control signal. The torque curve has a period or wavelength of 0.1 seconds, which coincides with the period of the dithered control signal. Finally, the amplitude of the torque curve is 30% of the maximum rated torque output of gearmotor 176.

Figure 14:
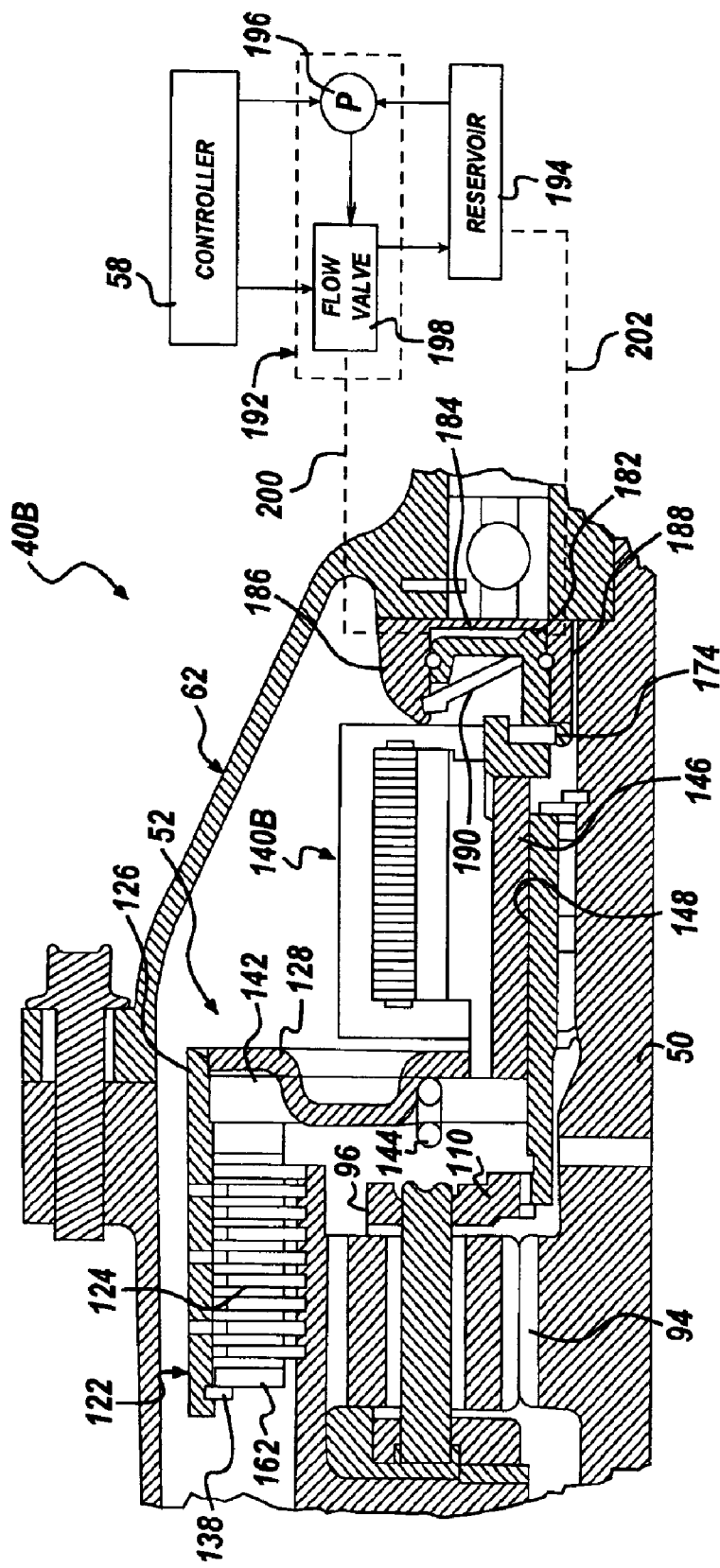
FIG. 14 is a partial sectional view showing an alternative clutch actuation mechanism for use with the transfer case of the present invention.

With respect to the full-time and on-demand power transfer system illustrated, it is contemplated that actuator 54 could comprise various alternatives to the gearmotor and sector plate system disclosed in FIGS. 2 and 3. One specific example is shown in FIG. 14, which shows a full-time transfer case 40B. Transfer case 40B is a modified version of transfer case 40A. In particular, clutch actuation mechanism 140A is modified to create a second clutch actuation mechanism 140B by replacing mode fork 156 with a piston 182 that is positioned in, and sealed relative to, an annular pressure chamber 184 formed in a piston housing 186 fixed to housing assembly 62. Piston 182 is shown to include an axial hub 188, which acts on bearing assembly 174. A return spring 190 is provided for biasing piston 182 to a retracted position within pressure chamber 184.

As schematically shown, a second actuator assembly 192 is provided to regulate the pressure of hydraulic fluid delivered from a reservoir 194 to pressure chamber 184 for controlling the axial position of piston 182, which in turn controls the axial position of thrust pins 148. More specifically, when a predetermined minimum fluid pressure is supplied to pressure chamber 184, lever arms 142 are located in the first position. In contrast, a predetermined maximum fluid pressure in pressure chamber 184 functions to position lever arms 142 in the second position. Thus, all of the different drive modes discussed above for full-time transfer case 40A are available with the hydraulic clutch actuation system provided for transfer case 40B.

Second actuator 192 is shown to include a pump 196 and a flow control valve 198. Pump 196 supplies hydraulic fluid at a predetermined pressure to control valve 198. Flow control valve 198 meters the fluid to pressure chamber 184 through a fluid connection 200. The fluid is discharged from pressure chamber 184 and is returned to supply reservoir 194 through a fluid connection 202.

Flow valve 198 is preferably electronically operated and is controlled by means of a digital control signal generated by controller 58. The fluid flow rate through control valve 198, and hence, the fluid pressure level within pressure chamber 184, is proportional to the duty cycle of the control signal.

Clutch actuation mechanism 140B of transfer case 40B is susceptible to the same performance degrading effects of friction that clutch actuation mechanism 140A of transfer case 40A is. To reduce the effect of friction, and in particular static friction, clutch actuation mechanism 140B can be continuously cycled in much the same manner as clutch actuation mechanism 140A. This is accomplished using any one of the above disclosed methods to superimpose a dithering signal onto the control signal generated by controller 58, which is used to control the operation of flow valve 198. The superimposed dithering signal causes the force generated by piston 182 to continuously fluctuate in a predetermined manner, thereby imparting a corresponding motion to clutch action mechanism 140B, thereby reducing the negative effect that friction has on the operation of the clutch actuation mechanism.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of regulating engagement of a torque transfer device by superimposing a dithering signal onto a digital control signal having multiple pulses to provide a dithered control signal, the method comprising the steps of:

(a) nulling blocks of pulses of the digital control signal having at least one nulled pulse per block, such that each successive block of nulled pulses has at least the same number of nulled pulses as the block that immediately precedes the succeeding block;

(b) nulling blocks of pulses of the digital control signal having at least one nulled pulse per block, such that each successive block of nulled pulses has an equal or less number of nulled pulses than the block that immediately precedes the succeeding block; and (c) regulating engagement of the torque transfer device based on the dithered control signal.

2. The method of claim 1 further comprising the step of:
   determining a period of the dithering signal;
   wherein step (a) occurs over a first half of the dithering period and step (b) occurs over a second half of the dithering period.

3. The method of claim 1 wherein the pulses are voltage pulses.

4. The method of claim 1 wherein the nulled pulses have a voltage that is substantially equal to zero.

5. The method of claim 1 wherein the control signal has a duty cycle that can be varied by modulating a pulse width.

6. The method of claim 1 wherein each block of nulled pulses consists of consecutively nulled pulses with no intervening non-nulled pulses.

7. The method of claim 1 wherein there is at least one pulse between succeeding blocks of nulled pulses.

8. The method of claim 1 wherein the pulses are spaced at intervals that are substantially equal to the reciprocal of a frequency of the control signal.

* * * * *